United States Patent
Shah (10) Patent No.: US 11,930,546 B2
(45) Date of Patent: Mar. 12, 2024

(54) MOBILE NODES IN AN INTEGRATED ACCESS BACKHAUL NETWORK

(71) Applicant: T-Mobile USA, Inc., Bellevue, WA (US)

(72) Inventor: Darshan Shah, Maple Valley, WA (US)

(73) Assignee: T-Mobile USA, Inc., Bellevue, WA (US)

(*) Notice: Subject to any disclaimer, the term of this patent is extended or adjusted under 35 U.S.C. 154(b) by 141 days.

(21) Appl. No.: 17/124,328

(22) Filed: Dec. 16, 2020

(65) Prior Publication Data

US 2022/0191957 A1   Jun. 16, 2022

(51) Int. Cl.
| | |
|---|---|
| *H04W 76/15* | (2018.01) |
| *H04B 17/318* | (2015.01) |
| *H04W 4/44* | (2018.01) |
| *H04W 4/46* | (2018.01) |
| *H04W 24/08* | (2009.01) |
| *H04W 88/14* | (2009.01) |

(52) U.S. Cl.
CPC .......... *H04W 76/15* (2018.02); *H04B 17/318* (2015.01); *H04W 4/44* (2018.02); *H04W 4/46* (2018.02); *H04W 24/08* (2013.01); *H04W 88/14* (2013.01)

(58) Field of Classification Search
None
See application file for complete search history.

(56) References Cited

U.S. PATENT DOCUMENTS

| | | | |
|---|---|---|---|
| 10,505,687 B1* | 12/2019 | Tailor | H04L 5/005 |
| 10,757,540 B1* | 8/2020 | Klinkner | H04W 68/04 |
| 11,190,901 B1* | 11/2021 | Makkiya | H04W 4/40 |
| 2013/0103779 A1* | 4/2013 | Bai | H04H 20/62 |
| | | | 709/213 |
| 2014/0045505 A1* | 2/2014 | Henry | H04W 24/02 |
| | | | 455/444 |
| 2015/0334545 A1* | 11/2015 | Maier | H04M 1/72433 |
| | | | 455/404.2 |
| 2019/0037613 A1* | 1/2019 | Anantharaman | H04W 12/06 |
| 2020/0178065 A1* | 6/2020 | Huber | H04L 63/1425 |
| 2020/0386568 A1* | 12/2020 | Dagley | G01C 21/3638 |
| 2021/0084558 A1* | 3/2021 | Speicher | H04W 28/0861 |
| 2022/0044561 A1* | 2/2022 | Szczepanik | G01N 33/0075 |

* cited by examiner

*Primary Examiner* — Adnan Baig
(74) *Attorney, Agent, or Firm* — Lee & Hayes P.C.

(57) ABSTRACT

Techniques are discussed herein for providing wireless communication services using mobile nodes in a cellular network, such as a 5G network. The mobile nodes may operate as Integrated Access and Backhaul (IAB) nodes which are utilized to provide wireless backhaul links and access links in a 5G network. One or more mobile nodes may be wirelessly coupled to a base station node (which may also be referred to herein as a "wired node"), such as a gNodeB, that includes a wired connection to the core network. The wireless backhaul extends coverage to user equipment (UE) that are not directly connected to a gNodeB base station.

20 Claims, 5 Drawing Sheets

MOBILE NODES IN AN INTEGRATED ACCESS BACKHAUL NETWORK

BACKGROUND

Different techniques can be used to connect remote cellular communications sites ("cell towers") with a core, or "backbone," cellular network to provide voice and data connectivity, among other things. Cellular service providers can use wired backhauls to provide backhaul for broadband cellular services and to support the addition of new cell sites, such as gNodeB sites supporting fifth generation (5G) new radio (NR) technology, to provide additional bandwidth and/or additional wireless coverage. Although millimeter waves (e.g. 24 GHz, 28 GHz, 39 GHz etc.) utilized by 5G coverage increase spectrum capacity and accommodate higher data speed, these signals have a limited coverage footprint due to their shorter wavelength. Additionally, these signals are sensitive to blockages such as buildings, cars, foliage, etc. Thus, there is a need to overcome millimeter wave propagation challenges.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Described herein are techniques and systems for providing wireless communication services using mobile nodes in a cellular network, such as a 5G network. As discussed above, cellular service providers can use wired backhauls to provide backhaul for broadband cellular services and to support the addition of new cell sites, such as gNodeB sites implementing 5G NR technology, to provide additional bandwidth and/or additional wireless coverage. Although millimeter waves (e.g. 24 GHz, 28 GHz, 39 GHz etc.) utilized by 5G coverage increase spectrum capacity and accommodate higher data speeds, these signals have a limited coverage footprint due to the shorter wavelength. Historically, the nodes supporting a 5G network have been fixed nodes that are wirelessly backhauled to a donor node and are unable to maneuver around blockages such as buildings, cars, foliage, etc.

Using techniques described herein, the higher frequency bands available in cellular networks, such as 5G networks, are utilized to provide both wireless backhaul links and access links. According to some configurations, a mesh of wireless nodes, such as Integrated Access and Backhaul (IAB) nodes (which may be referred to herein as "relay nodes," "mobile nodes," and/or "mobile IAB nodes"), are utilized to provide wireless backhaul links and access links in a 5G network. One or more relay nodes and/or mobile nodes may be wirelessly coupled to a base station node (which may also be referred to herein as a "wired node"), such as gNodeB, that includes a wired connection to the core network. The wireless backhaul extends coverage to user equipment (UE) that are not directly connected to a gNodeB base station. The relay nodes and/or the mobile nodes are configured to provide wireless access to any UE that is connected. For example, a relay node and/or a mobile node may provide wireless access to each of the UEs connected to it, along with providing wireless backhaul received from one or more other relay nodes and/or mobile nodes.

In one example, a first mobile node may be coupled with a first vehicle and may be configured to provide wireless backhaul links and access links in a 5G network. The first mobile node may be configured to monitor a communication link between the first vehicle and a first wired node, a first relay node, a first UE, and/or a second vehicle. For example, the first vehicle may include communication components enabling the first vehicle to communicate via the access network. The first vehicle may utilize the access network, via the first mobile node, to communicate with the UE, communicate with the other vehicles, such as the second vehicle, (e.g., to prevent collisions) and/or perform vehicle maneuvers (e.g., parallel parking, changing lanes, operate warning sensors, etc.).

In some scenarios, the first mobile node may monitor a signal strength of the communication link. For example, the first mobile node may monitor a signal strength of the communication link and determine if the signal strength is below and/or above a predetermined threshold. In some cases, if the signal strength drops below the predetermined threshold, the first mobile node may scan a geographical area for another node to provide access to the access network. For example, the first mobile node may determine a predefined distance around the first vehicle and scan for additional wired nodes and/or relay nodes that the first mobile node may access within the predefined distance in order to provide the first vehicle with access to the access network. Once a second wired node and/or relay node is discovered, the first mobile node may provide the first vehicle with access to the access network via the second wired node and/or relay node.

In some scenarios, when the communication link signal strength has dropped below the predefined threshold, the first mobile node may also scan for a second mobile node that may provide access to the access network. For example, the second mobile node be coupled to a second vehicle and may provide access to the access network by relaying a communication link to one of the relay nodes and/or the wired node.

In some scenarios, the first mobile node may establish a geo-fence within a predefined distance of the first vehicle (e.g., 3 feet, 5 feet, 15 feet, etc.) and the first mobile node may determine whether or not the first mobile node is located within the geo-fence. For example, if the first mobile node is removed from the first vehicle and transported outside the geo-fence (e.g., during a theft), the first mobile node may send a transmission to a UE associated with a user that owns or is otherwise associated with the first vehicle indicating that the first mobile node has been removed from the first vehicle.

In some examples, the first mobile node may cause the first vehicle to perform a variety of operations, such as but not limited to, locking/unlocking doors, turning lights on/off, starting the engine, shutting the engine off, etc. For example, the first mobile node may store identifying information of a UE associated with a user that owns or is otherwise associated with the first vehicle. In response to the UE being within a predefined distance of the first mobile node and/or the UE forming a communication link with the first mobile node, the first mobile node may cause the first vehicle to perform an operation (locking/unlocking doors, turning lights on/off, starting the engine, shutting the engine off, etc.). In some cases, the first vehicle may be an autonomous driving vehicle and may allow the user to enter the vehicle (i.e., unlock the doors) in response to the UE associated with the user being within a predefined distance of the first mobile node and/or the UE forming a communication link with the first mobile node.

Illustrative Environment

Figure 1:
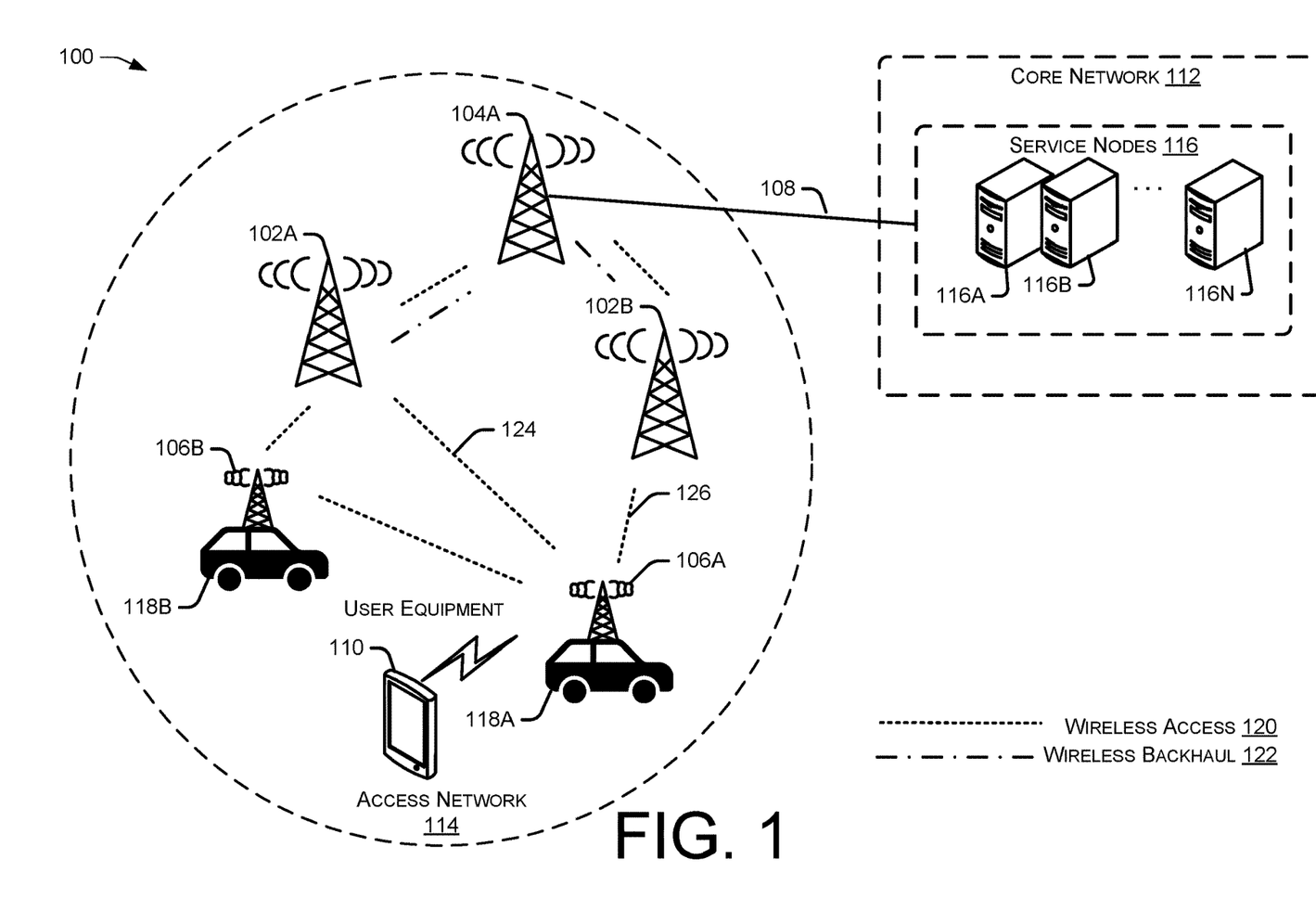
FIG. 1 is a block diagram showing an illustrative environment for providing wireless backhaul in a cellular network via a mobile node.

FIG. 1 is an illustrative environment 100 for providing telecommunication service of a cellular network via one more mobile nodes. The environment 100 may include a core network 112 and an access network 114 that is associated with a wireless service provider. The environment 100 is illustrated in simplified form and may include many more components.

The environment 100 may include nodes, such as relay nodes 102A, 102B, one or more wired nodes, such as wired node 104A, and one or more mobile nodes, such as mobile nodes 106A and 106B. A relay node 102, a wired node 104, and/or a mobile node 106 may handle traffic and signals between electronic devices, such as the user equipment (UE) 110, and a core network 112. For example, a node 102, 104, and/or 106 may perform the transcoding of speech channels, allocation of radio channels to electronic devices, paging, transmission and reception of voice and data, as well as other functions. A node 102, 104, and/or 106 may include several base transceiver stations (BTS), each BTS may include a transceiver, antenna, and additional network switch and control equipment that provide a network cell for facilitating wireless communication between UE computing devices and the core network 112. In some examples, the nodes 102, 104, and/or 106 include a gNodeB and/or an eNodeB.

The core network 112 may be responsible for routing voice communication to other networks, as well as routing data communication to external packet switched networks, such as the Internet. For example, the one or more service nodes 116 may be a Gateway GPRS Support Node (GGSN) or another equivalent node. According to some configurations, the one or more service nodes also include a Policy and Charging Rules Function (PCRF) node that utilized to enforce policy rules of the network. The PCRF node can be configured to automatically make policy decisions for each subscriber (e.g., each user equipment (UE)) active on the network. For example, the PCRF may be utilized to allocate bandwidth of the network as well as provide different levels of service to different computing devices on the network. Additionally, some data can be prioritized within the network.

The UE 110 is a computing device that may be a smart phone, a personal digital assistant, a netbook, a laptop computer, and/or another electronic that is capable of sending and/or receiving voice or data using a cellular access network 114, and/or over a Wi-Fi network, or some other type of network. In some instances, the computing device 110 can be configured to send and receive data using any wired or wireless protocols.

In some configurations, one or more of the service nodes 116 may be configured as one or more application servers that provide support for one more applications. Some example applications include, but are not limited to browser applications, messaging applications, voice applications (e.g., Voice over Internet Protocol "VoIP" applications), video applications, and the like. While the service nodes 116 are illustrated within the core network 112, one or more other computing devices may be located outside of the core network 112. For example, an application server, or some other server or device, may be connected to the core network 112 via one or more external packet switched networks, such as the Internet.

In some configurations, a wireless service provider may utilize alternative access vendor (AAV) networks, for example, which utilize Ethernet networks to provide a wired connection, such as wired connection 108, to provide at least a portion of backhaul for broadband cellular services, such as 5G networks. In other examples, the wireless service provider may deploy its own wired connections.

In general, a node, such as relay nodes 102, wired nodes 104, and mobile nodes 106 can be implemented as a variety of technologies to provide wired and/or wireless access to the network, as discussed herein. In some instances, the nodes 102, 104, and/or 106 can include a 3GPP RAN, such a GSM/EDGE RAN (GERAN), a Universal Terrestrial RAN (UTRAN), an evolved UTRAN (E-UTRAN), or a New Radio (5G) RAN, or alternatively, a "non-3GPP" RAN, such as a Wi-Fi RAN, or another type of wireless local area network (WLAN) that is based on the IEEE 802.11 standards. Further, the nodes 102, 104, and/or 106 can include any number and type of transceivers and/or base stations representing any number and type of macrocells, microcells, picocells, or femtocells, for example, with any type or amount of overlapping coverage or mutually exclusive coverage. The nodes 102, 104, and/or 106 can be associated with access network 114.

In some instances, the environment 100 can further include one or more servers, including service nodes 116, to facilitate communications by and between the various devices in the environment 100. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5G NR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 110, the nodes 102, 104, and/or 106, and one or more endpoints of the network (e.g., service nodes 116, websites, etc.). While FIG. 1 illustrates an example environment 100, it is understood in the context of this document, that the techniques discussed herein may also be implemented in other networking technologies.

The access network 114 can be any sort of access network, such as a GSM or UMTS network. The access network 114 can include any aspects of one or more of second, third, fourth generation, and fifth generation (2G, 3G, 4G, and 5G) cellular-wireless access technologies. The access network 114 can also be referred to as a universal terrestrial radio network (UTRAN) or a GSM EDGE radio access network (GERAN) and can include one or base stations, as well as a radio network controller (RNC).

Examples of the user equipment (UE) 110 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the UE 110 include, but are not limited to, smart devices such as televisions, music players, or any other electronic appliances that can generate, request, receive, transmit, or exchange voice, video, and/or digital data over a network.

The UE 110 can further be configured to establish or receive a communication session, such as a VoLTE, VoNR, VoWifi, or other voice call, a video call, or another sort of communication. Establishment of such sessions can involve communication clients and Session Initiation Protocol (SIP) clients to communicate with the telecommunications network.

As shown in FIG. 1, the mobile node 106A may be coupled with a vehicle 118A and may be configured to provide access to the nodes 102 and/or 104. The mobile node 106A may be configured to monitor a communication link between the vehicle 118A and a first wired node (e.g., the wired node 104A), a first relay node (e.g., relay node 102A and/or 102B), a first UE (e.g., UE 110), and/or a second vehicle, such as a vehicle 118B. For example, the vehicle 118A may include communication components enabling the vehicle 118A to communicate via the access network 114. The vehicle 118A may utilize the access network 114, via the mobile node 106A, to communicate with the UE 110, communicate with the other vehicles, such as the vehicle 118B, (e.g., to prevent collisions) and/or perform vehicle maneuvers (e.g., parallel parking, changing lanes, operate warning sensors, etc.). In some examples, the UE 110 may be associated with a user who owns the vehicle 118A and/or is otherwise associated with the vehicle 118A. In some cases, the UE 110 may be located within the vehicle 118A or within a predefined distance of the vehicle 118A.

In some scenarios, the mobile node 106A may monitor a signal strength of a communication link 124 that is established between a communication component of the vehicle 118A and the relay node 102A. For example, the mobile node 106A may monitor a signal strength of the communication link 124 and determine if the signal strength is below and/or above a predetermined threshold. Although FIG. 1 illustrates the communication link 124 being between the relay node 102A and the mobile node 106A, in some cases, the communication link 124 may be between the wired node 104A and the mobile node 106A. In some cases, if the signal strength drops below the predetermined threshold, the mobile node 106A may scan a geographical area for another node to provide access to the access network 114. For example, the mobile node 106A may determine a predefined distance around the vehicle 118A and scan for additional wired nodes and/or relay nodes that the mobile node 106A may access within the predefined distance in order to provide the vehicle 118A with access to the access network 114. Once a second wired node and/or relay node is discovered, such as relay node 102B, the mobile node 106A may provide the vehicle 118A with access to the access network 114 via the relay node 102B. In some cases, the mobile node 106A may send a transmission to the vehicle 118A causing the communication component of the vehicle 118A to establish a communication link 126 with the relay node 102B. In other cases, the mobile node 106A may establish the communication link 126 and route the communication component of the vehicle 118A through the mobile node 106A to the relay node 102B via the communication link 126. Although FIG. 1 illustrates the communication link 126 being between the relay node 102B and the mobile node 106A, in some cases, the communication link 126 may be between a wired node and the mobile node 106A.

In some scenarios, when the signal strength of the communication link 124 has dropped below the predefined threshold, the mobile node 106A may also scan for other mobile nodes, such as mobile node 106B, within a predefined distance of the vehicle 118A that may provide access to the access network 114. For example, the mobile node 106B be coupled to a vehicle 118B and may provide access to the access network 114 by relaying a communication link to one of the relay nodes 102 and/or the wired node 104.

In some scenarios, the mobile node 106A may establish a geo-fence within a predefined distance of the vehicle 118A (e.g., 3 feet, 5 feet, 15 feet, etc.) and the mobile node 106A may determine whether or not the mobile node 106A is located within the geo-fence. For example, if the mobile node 106A is removed from the vehicle 118A and transported outside the geo-fence (e.g., during a theft), the mobile node 106A may send a transmission to the UE 110 that is associated with a user that owns or is otherwise associated with the vehicle 118A indicating that the mobile node 106A has been removed from the vehicle 118A.

In some examples, the mobile node 106A may cause the vehicle 118A to perform a variety of operations, such as but not limited to, locking/unlocking doors, turning lights on/off, starting the engine, shutting the engine off, etc. For example, the mobile node 106A may store identifying information of the UE 110 associated with a user that owns or is otherwise associated with the vehicle 118A. In response to the UE 110 being within a predefined distance of the mobile node 106A and/or the UE 110 forming a communication link with the mobile node 106A, the mobile node 106A may determine that the user is authorized to access the vehicle 118A and may cause the vehicle 118A to perform an operation (locking/unlocking doors, turning lights on/off, starting the engine, shutting the engine off, turning the air conditioning on/off, turning the heat on/off, etc.). In some cases, the vehicle 118A may be an autonomous driving vehicle and may allow the user to enter the vehicle (e.g., unlock the doors) in response to the UE 110 associated with the user being within a predefined distance of the mobile node 106A and/or the UE 110 forming a communication link with the mobile node 106A.

Figure 2:
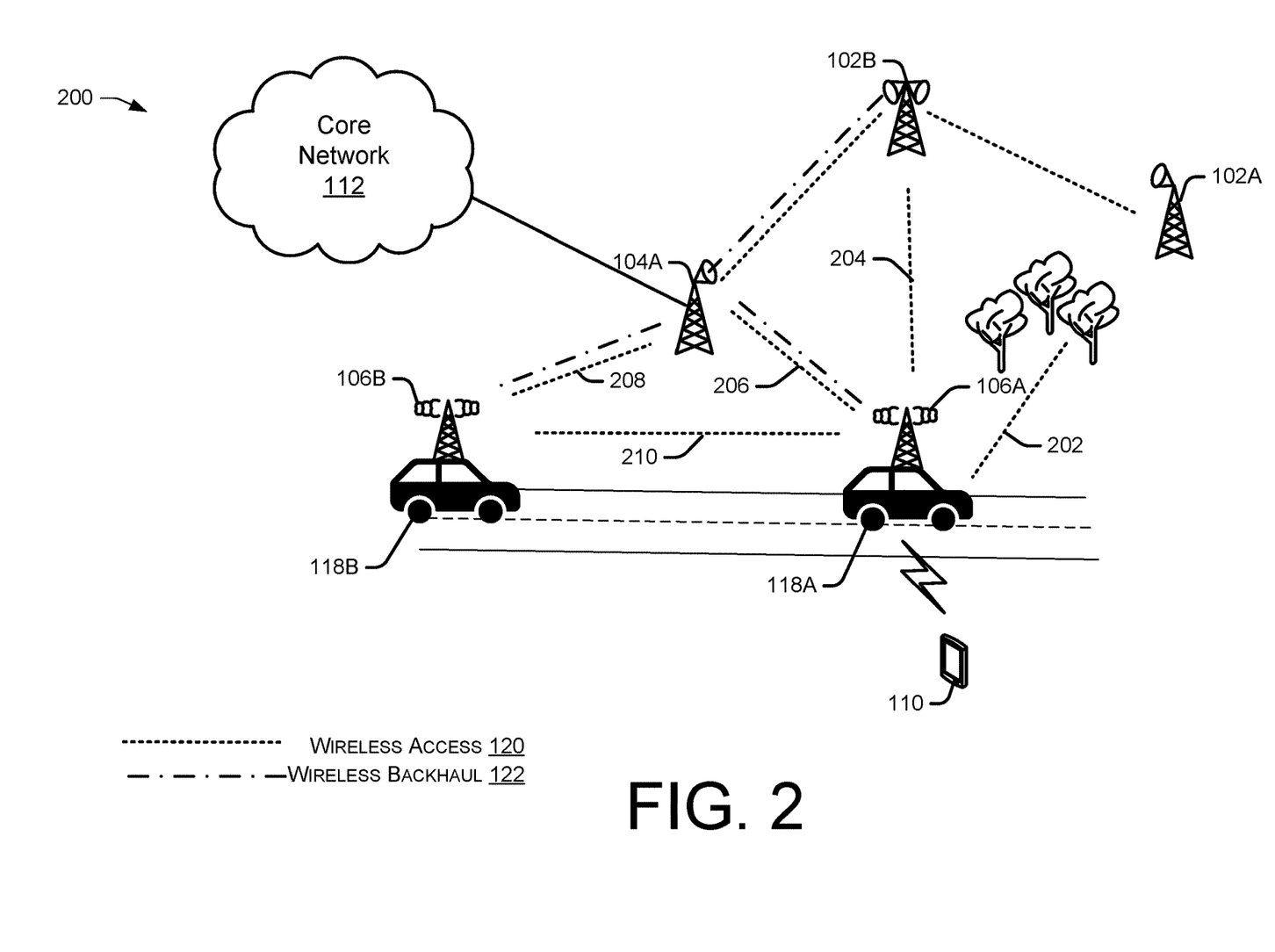
FIG. 2 is a diagram showing an illustrative arrangement of relay nodes and mobile nodes providing wireless backhaul in a cellular network.

FIG. 2 is a diagram showing illustrative environment 200 showing arrangements of relay nodes 102A, 102B, wired node 104A, and mobile nodes 106A, 106B, as the vehicles 118A and 118B may move in relation to the relay nodes 102A, 102B and the wired node 104A. For example, a communication component of the vehicle 118A may communicate with the relay node 102A via a communication link 202 in order to access the core network 112. In some examples, the vehicle 118A may be a smart vehicle and may be part of the Internet of Things (IoT) and therefore requires a connection to the core network 112 in order to provide services to a user who owns the vehicle 118A or is otherwise associated with the vehicle 118A. In some cases, the mobile node 106A may monitor calls made by the UE 110, which may be located within the vehicle 118A and/or within a predefined distance of the vehicle 118A. As the vehicle 118A moves, the mobile node 106A may monitor a signal strength of a communication link 202 that is established between the communication component of the vehicle 118A and/or the UE 110 and the relay node 102A. For example, the mobile node 106A may monitor a signal strength of the communication link 202 and determine if the signal strength is below and/or above a predetermined threshold. As shown in FIG. 2, the signal strength may drop due to interreference of the communication link 202 due to foliage, buildings, etc. as the vehicle 118A travels. In some cases, if the signal strength drops below the predetermined threshold, the mobile node 106A may scan a geographical area for another node to provide access to the access network. For example, the mobile node 106A may determine a predefined distance around the vehicle 118A and scan for additional wired nodes and/or relay nodes that the mobile node 106A may access within the predefined distance in order to provide the vehicle 118A and/or the UE 110 with access to the access network. Once a second wired node and/or relay node is discovered, such as relay node 102B or the wired node 104A, the mobile node 106A may provide the vehicle 118A and/or the UE 110 with access to the access network via the relay node 102B and/or the wired node 104A. In some cases, the mobile node 106A may send a transmission to the vehicle 118A and/or the UE 110 causing the communication component of the vehicle 118A and/or the UE 110 to establish a communication link 204 with the relay node 102B and/or a communication link 206 with the wired node 104A. In other cases, the mobile node 106A may establish the communication link 204 with the relay node 102B and/or the communication link 206 with the wired node 104A and route the communication component of the vehicle 118A and/or the UE 110 through the mobile node 106A to the relay node 102B via the communication link 204 and/or the wired node 104A via the communication link 206.

In some scenarios, when the signal strength of the communication link 202 has dropped below the predefined threshold, the mobile node 106A may also scan for other mobile nodes, such as mobile node 106B, within a predefined distance of the vehicle 118A that may provide access to the access network. For example, the mobile node 106B be coupled to a vehicle 118B and may provide access to the access network via a communication link 208 to the wired node 104A and/or one or more other nodes, such as the relay nodes 102. In some cases, the mobile node 106A may send a transmission to the vehicle 118A causing the communication component of the vehicle 118A and/or the UE 110 to establish a communication link 210 with the mobile node 106B which, in turn, connects the communication component of the vehicle 118A and/or the UE 110 to the wired node 104A. In other cases, the mobile node 106A may establish the communication link 210 and route the communication component of the vehicle 118A and/or the UE 110 through the mobile node 106A to the mobile node 106B via the communication link 210 which, in turn, connects the communication component of the vehicle 118A and/or the UE 110 to the wired node 104A.

In some examples, the mobile node 106A may monitor calls made by the communication component of the vehicle 118A and/or the UE 110 and may determine a type of call being made. For example, the mobile node 106A may determine that the communication component of the vehicle 118A and/or the UE 110 is making an E911 call intended for a public-safety answering point (PSAP). In this case, the mobile node 106A may automatically direct the call to the PSAP via the mobile node 106A.

Figure 3:
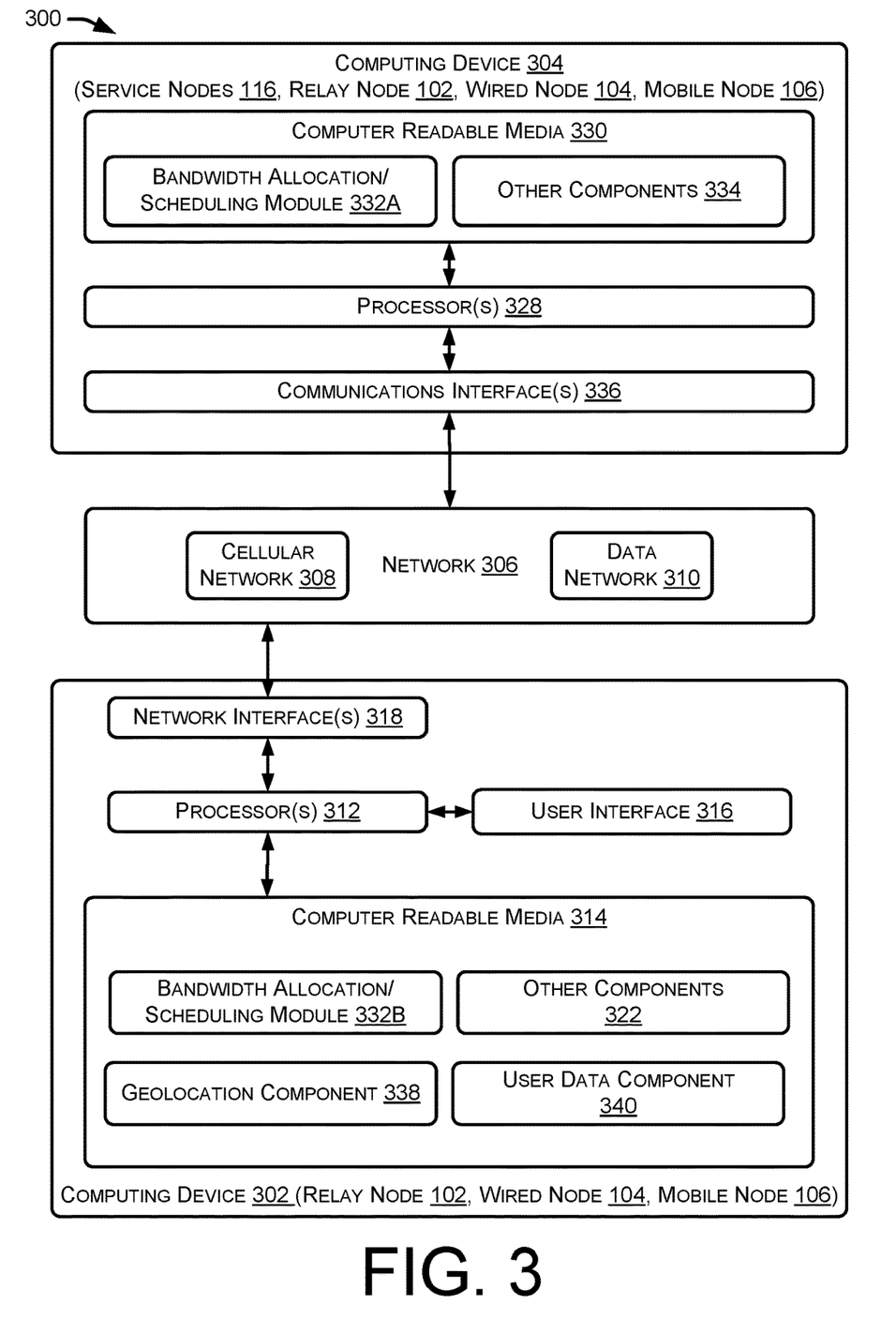
FIG. 3 is a block diagram illustrating a system that includes node components for providing wireless backhaul in a cellular network.

FIG. 3 is a block diagram illustrating a system 300 that includes an allocation and bandwidth allocation/scheduling module 332 for identifying relay nodes 102 and allocating/scheduling bandwidth for wireless access links 120 and wireless backhaul links 122 in a cellular network according to some examples. The system 300 includes a computing device 302, which can represent relay nodes 102, wired nodes 104, and/or mobile nodes 106 of FIG. 1 and FIG. 2 coupled to computing device 304, via a network 306. The computing device 304 can represent one or more of the service nodes 116, a relay node 102, a wired node 104, and/or a mobile node 106. The network 306 can represent, e.g., networks 112 or 114.

The network 306 can include one or more core network(s) 112 connected to nodes 102, 104, and/or 106 via one or more access network(s), such as access network 114. Example access networks include 5G NR, LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, WIFI, or other networks.

The cellular network 308 can provide wide-area wireless coverage using a technology such as GSM, Code Division Multiple Access (CDMA), UMTS, LTE, 5G NR, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology.

The data network 310 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the computing device 304 includes or is communicatively connected with an IWF or other device bridging networks, e.g., 5G, LTE, 3G, and POTS networks. In some examples, the computing device 304 can bridge SS7 traffic from the PSTN into the network 306, e.g., permitting PSTN customers to place calls to cellular customers and vice versa.

In some examples, the cellular network 308 and the data network 310 can carry voice or data. For example, the data network 310 can carry voice traffic using VoIP or other technologies as well as data traffic, or the cellular network 308 can carry data packets using HSPA, LTE, 5G NR, or other technologies as well as voice traffic. Some cellular networks 308 carry both data and voice in a packet-switch (PS) format. For example, many LTE networks carry voice traffic in data packets according to the VoLTE standard. Various examples herein provide origination and termination of, e.g., carrier-grade voice calls on, e.g., networks 306 using circuit-switching (CS) transports or mixed VoLTE/3G transports, or on computing device 302 including OEM handsets and non-OEM handsets.

The computing device 302 can include one or more processors 312, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 314, such as memory (e.g., random access memory (RAM), solid state drives (SSDs), or the like), disk drives (e.g., platter-based hard drives), another type of computer-readable media, or any combination thereof. The CRM or other memory of computing device 302 can hold a datastore, e.g., an SQL or NoSQL database, a graph database, a BLOB, or another collection of data. The computing device 302 can further include a user interface (UI) 316, e.g., including an electronic display device, a speaker, a vibration unit, a touchscreen, or other devices for presenting information to a user and receiving commands from a user. The computing device 302 can further include one or more network interface(s) 318 configured to selectively communicate (wired or wirelessly) via the network 306, e.g., via an access network 114 or 308, 310. The computing device 302 may further include a geolocation component 338 configured to determine a location of the computing device 302 and capable of establishing geo-fences. For example, the computing device 302 may establish a geo-fence within a predefined distance of first vehicle (e.g., 3 feet, 5 feet, 15 feet, etc.) and determine whether or not the computing device 302 is located within the geo-fence. The computing device 302 may further include a user data component 340 configured to store user identification data associated with users and/or user devices. For example, computing device 302 may store identifying information of a UE associated with a user that owns or is otherwise associated with a vehicle. In response to the UE being within a predefined distance of the computing device 302 and/or the UE forming a communication link with the computing device 302, the computing device 302 may cause the vehicle to perform an operation (locking/unlocking doors, turning lights on/off, starting the engine, shutting the engine off, etc.).

The CRM 314 can be used to store data and to store instructions that are executable by the processors 312 to perform various functions as described herein. The CRM 314 can store various types of instructions and data, such as an operating system, device drivers, etc. The processor-executable instructions can be executed by the processors 312 to perform the various functions described herein.

The CRM 314 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 312. Tangible computer-readable media can include volatile and nonvolatile, removable and non-removable media implemented in any method or technology for storage of information, such as computer readable instructions, data structures, program components, or other data.

The CRM 314 can include processor-executable instructions of a bandwidth allocation/scheduling module 332B. The bandwidth allocation/scheduling module 332B, can be configured to perform functionality relating to providing wireless backhaul in a cellular network, such as a 5G network. The CRM 314 can also store other components 322 configured to perform other functionality.

The computing device 304 can include one or more processors 328 and one or more CRM 330. The CRM 330 can be used to store processor-executable instructions of a bandwidth allocation/scheduling module 332A, as well as one or more other components 334. In some configurations, the computing device 304 can be configured as a service node 116, some other service node, and the like. The processor-executable instructions can be executed by the one or more processors 328 to perform various functions described herein, e.g., with reference to FIGS. 1-3.

In some examples, computing device 304 can communicate with (e.g., is communicatively connectable with) computing device 302 or other devices via one or more communications interface(s) 336, e.g., network transceivers for wired or wireless networks, or memory interfaces. Example communications interface(s) 336 can include ETHERNET or FIBRE CHANNEL transceivers, WIFI radios, or DDR memory-bus controllers (e.g., for DMA transfers to a network card installed in a physical server).

In some examples, processor 312 and, if required, CRM 314, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 328 and, if required, CRM 330.

Figure 4:
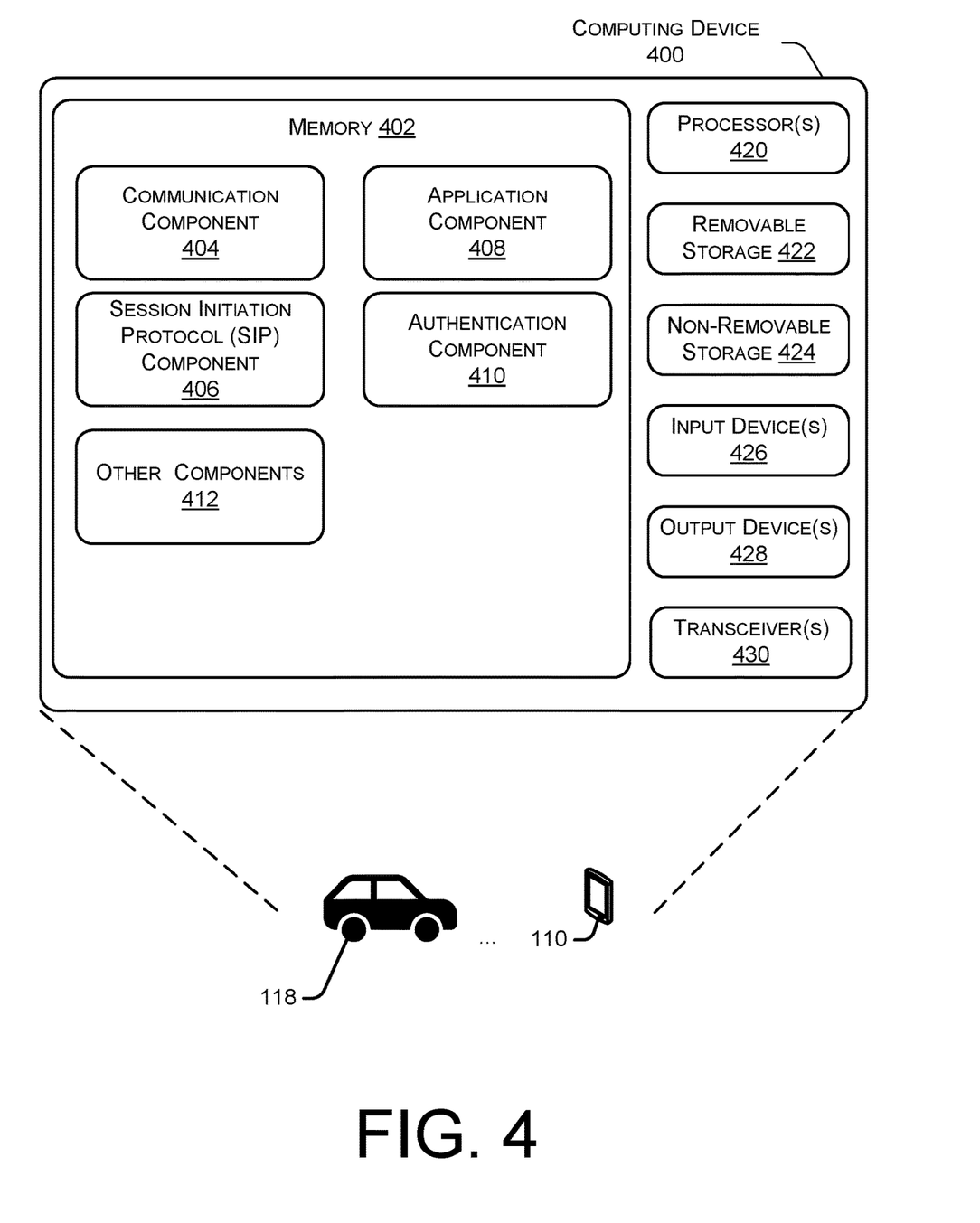
FIG. 4 is a block diagram illustrating an example computing device configured to connect to a mobile node that provides wireless backhaul in a cellular network.

FIG. 4 illustrates an example computing device 400 configured to connect to a relay node and/or a mobile node that provides wireless backhaul in a cellular network. In some embodiments, the computing device 400 can correspond to the vehicle 118 and/or the UE 110 of FIG. 1. It is to be understood in the context of this disclosure that the computing device 400 can be implemented as a single device or as a plurality of devices with components and data distributed among them.

As illustrated, the computing device 400 comprises a memory 402 storing the communication component 404, a session initiation protocol (SIP) component 406, an application component 408, an authentication component 410, and other components 412. Also, the computing device 400 includes processor(s) 420, a removable storage 422 and non-removable storage 424, input device(s) 426, output device(s) 428, and transceiver(s) 530.

In various embodiments, the memory 402 is volatile (such as RAM), non-volatile (such as ROM, flash memory, etc.) or some combination of the two. The communication component 404, the SIP component 406, the application component 408, the authentication component 410, and the other components 412 stored in the memory 402 can comprise methods, threads, processes, applications, or any other sort of executable instructions. The communication component 404, the SIP component 406, the application component 408, the authentication component 410, and the other components 412 can also include files and databases.

The communication component 404 may include functionality to send and receive communication (e.g., a voice call, an SMS, or an MMS) and/or perform other operations. In some examples, the communication component 404 may perform a number of functions, such as interfacing with the transceiver(s) 530, preparing the computing device 400 to receive or handover a call, tuning the transceiver(s) 530, receiving and processing an invitation message such as a SIP Message received via the transceiver(s) 530, transmitting other messages via the transceiver(s) 530, detecting a failure condition, and the like.

The SIP component 406 may be an application that enables calls to be served via Voice over Internet Protocol (VoIP) using Session Initiation Protocol (SIP) signaling. The SIP component 406 may determine a current location of the computing device 400 using a Global Positioning System (GPS).

The application component 408 may display various information associated with a communication session. The application component 408 may provide a portal for the user to sign up for services with a service provider. In various examples, the application component 408 may provide an interface for the user(s) to register new user accounts and download one or more applications associated with the service provider, such as the authentication component 410. The application component 408 may communicate with servers of the service provider for the user equipment(s) 110 through the communication component 404 to receive or update user settings.

The authentication component 410 may perform various types of authentication. The authentication component 410 may interact with the database(s) to store, retrieve, and update the database(s) containing user subscription information, including items such as user identification and addressing (e.g., the IMSI (International Mobile Subscriber Identity) and MSISDN (Mobile Subscriber ISDN Number)), user profile information (e.g., subscription data). The authentication component 410 may also be configured to perform other operations.

The authentication component 410 may authenticate the computing device 400 to send and receive communication using a user account. The other components 412 may perform other operations. In some embodiments, the processor(s) 420 is a central processing unit (CPU), a graphics processing unit (GPU), or both CPU and GPU, or other processing unit or component known in the art.

Figure 5:
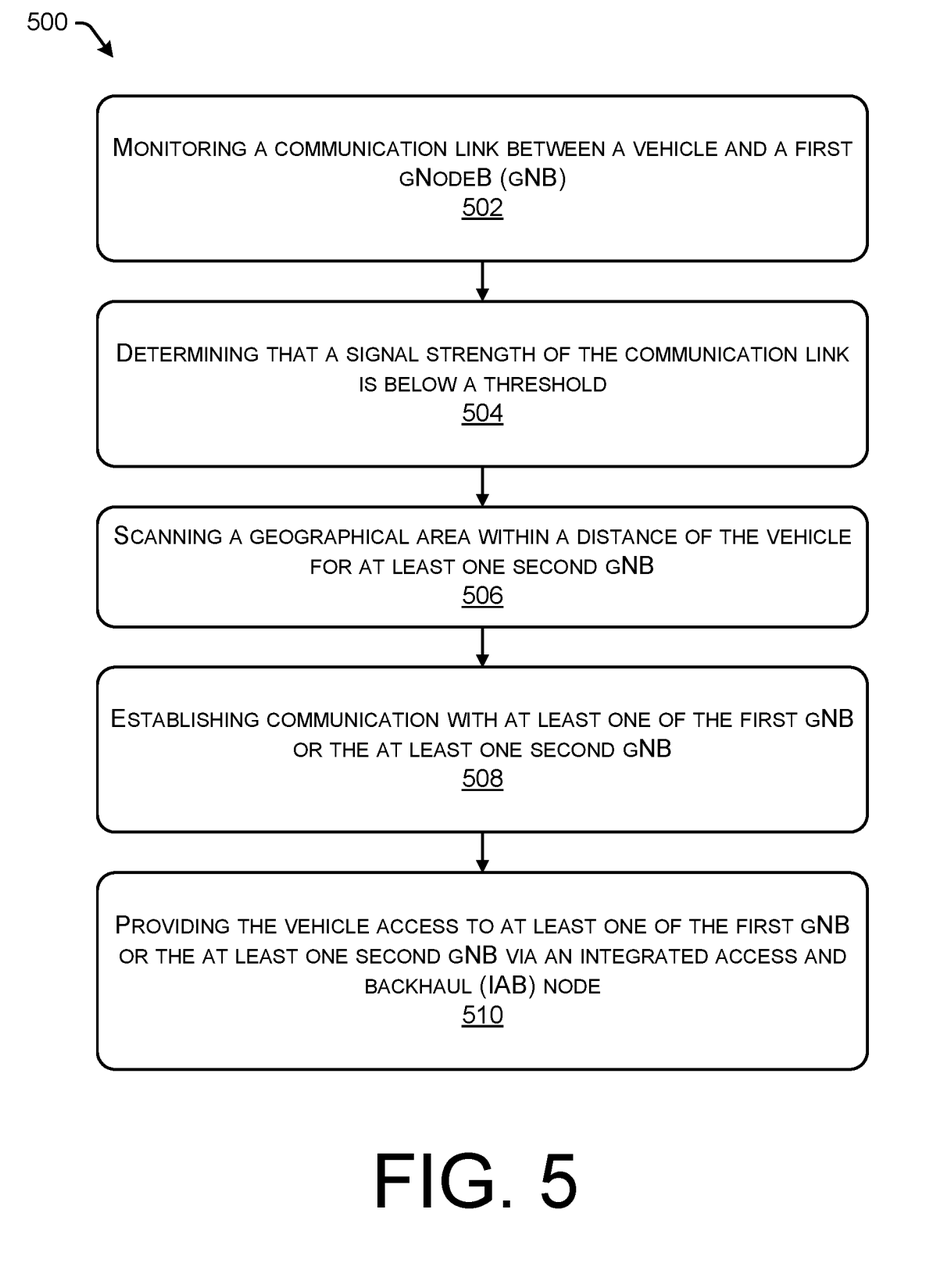
FIG. 5 illustrates an example process for using mobile nodes to provide wireless backhaul in a cellular network.

The computing device 400 also includes additional data storage devices (removable and/or non-removable) such as, for example, magnetic disks, optical disks, or tape. Such additional storage is illustrated in FIG. 5 by removable storage 422 and non-removable storage 424. Tangible computer-readable media can include volatile and nonvolatile, removable and non-removable media implemented in any method or technology for storage of information, such as computer readable instructions, data structures, program modules, or other data. The memory 402, the removable storage 422 and the non-removable storage 424 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the UE. Any such tangible computer-readable media can be part of the UE.

The computing device 400 can include input device(s) 426, such as a keypad, a cursor control, a touch-sensitive display, etc. Also, the computing device 400 can include output device(s) 428, such as a display, speakers, etc. These devices are well known in the art and need not be discussed at length here.

As illustrated in FIG. 4, the computing device 400 can include one or more wired or wireless transceiver(s) 430. In some wireless embodiments, to increase throughput, the transceiver(s) 430 can utilize multiple-input/multiple-output (MIMO) technology. The transceiver(s) 430 can be any sort of wireless transceivers capable of engaging in wireless, radio frequency (RF) communication, as discussed herein. The transceiver(s) 430 can also include other wireless modems, such as a modem for engaging in Wi-Fi, WiMAX, Bluetooth, infrared communication, or the like.

FIG. 5 illustrates an example process 500 in accordance with embodiments of the disclosure. The process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process for using mobile nodes to provide wireless backhaul in a cellular network. The example process 500 can be performed by one or more of the relay nodes 102, the wired nodes 104, the mobile nodes 106, the computing device 302, computing device 304, the service nodes 116, or one or more other components, in connection with other components discussed herein. Some or all of the process 500 can be performed by one or more devices, equipment, or components illustrated in FIGS. 1-4, for example.

At 502, a computing device may monitor a communication link between a vehicle and a first gNodeB (gNB). For example, the mobile node 106A may monitor a signal strength of a communication link 124 that is established between a communication component of the vehicle 118A and the relay node 102A.

At 504 a computing device may determine that a signal strength of the communication link is below a threshold. For example, the mobile node 106A may monitor a signal strength of the communication link 124 and determine if the signal strength is below and/or above a predetermined threshold.

At 506, a computing device may scan a geographical area within a distance of the vehicle for at least one second gNB. For example, if the signal strength drops below the predetermined threshold, the mobile node 106A may scan a geographical area for another node to provide access to the access network 114. For example, the mobile node 106A may determine a predefined distance around the vehicle 118A and scan for additional wired nodes and/or relay nodes that the mobile node 106A may access within the predefined distance in order to provide the vehicle 118A with access to the access network 114.

At 508, a computing device may establish communication with at least one of the first gNB or the at least one second gNB. For example, once a second wired node and/or relay node is discovered, such as relay node 102B, the mobile node 106A may provide the vehicle 118A with access to the access network 114 via the relay node 102B.

At 510, a computing device may provide the vehicle access to at least one of the first gNB or the at least one second gNB via an integrated access and backhaul (IAB) node. For example, the mobile node 106A may send a transmission to the vehicle 118A causing the communication component of the vehicle 118A to establish a communication link 126 with the relay node 102B. In other cases, the mobile node 106A may establish the communication link 126 and route the communication component of the vehicle 118A through the mobile node 106A to the relay node 102B via the communication link 126.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by a mobile integrated access and backhaul (IAB) node, the method comprising: monitoring a communication link between communication components of a vehicle and a first gNodeB (gNB), the communication components of the vehicle being separate from the mobile IAB node and configured to communicate with a telecommunication core network via the first gNB; determining that a signal strength of the communication link is below a threshold; scanning a geographical area within a distance of the vehicle for at least one second gNB; establishing communication with at least one of the first gNB or the at least one second gNB; providing the vehicle access to at least one of the first gNB or the at least one second gNB via the mobile IAB node; and sending a transmission to a UE associated with the vehicle indicating that the mobile IAB node has been removed from the vehicle in response to determining that the mobile IAB node has exited a geo-fence defining an area around the vehicle.

2. The method of claim 1, wherein the vehicle comprises a first vehicle and the method further comprises establishing a communication link between the mobile IAB node and a second vehicle such that the first vehicle may communicate with the second vehicle via the mobile IAB node.

3. The method of claim 1, further comprising providing access to at least one user equipment (UE) located inside the vehicle to at least one of the first gNB or the at least one second gNB via the mobile IAB node.

4. The method of claim 1, further comprising establishing an E911 call from the vehicle or a UE located inside the vehicle via the mobile IAB node.

5. The method of claim 1, wherein determining that the signal strength of the communication link is below the threshold is performed at a first location associated with the mobile IAB node and providing the vehicle access to at least one of the first gNB or the at least one second gNB via the mobile IAB node is performed at a second location associated with the mobile IAB node that is different than the first location.

6. The method of claim 1, further comprising determining the geo-fence defining the area around the vehicle.

7. The method of claim 1, further comprising determining an authorization of a user in response to a UE associated with the user communicating with the mobile IAB node.

8. A mobile integrated access and backhaul (IAB) node comprising: one or more processors; and non-transitory computer-readable media storing computer-executable instructions that, when executed by the one or more processors, cause the one or more processors to perform actions comprising: monitoring a communication link between communication components of a vehicle and a first node, the communication components of the vehicle being separate from the mobile IAB node and configured to communicate with a telecommunication core network via a gNodeB; determining that a signal strength of the communication link is below a predefined threshold; scanning a geographical area within a distance of the vehicle for at least one second node; establishing communication with at least one of the first node or the at least one second node; providing the vehicle access to at least one of the first node or the at least one second node via the mobile IAB node; and sending a transmission to a UE associated with the vehicle indicating that the mobile IAB node has been removed from the vehicle in response to determining that the mobile IAB node has exited a geo-fence defining an area around the vehicle.

9. The mobile IAB node of claim 8, wherein the vehicle comprises a first vehicle and the actions further comprise establishing a communication link between the IAB node and a second vehicle such that the first vehicle may communicate with the second vehicle via the mobile IAB node.

10. The mobile IAB node of claim 8, further comprising providing access to at least one user equipment (UE) located inside the vehicle to at least one of the first node or the at least one second node via the mobile IAB node.

11. The mobile IAB node of claim 8, further comprising establishing an E911 call from the vehicle or a UE located inside the vehicle via the mobile IAB node.

12. The mobile IAB node of claim 8, wherein determining that the signal strength of the communication link is below the predefined threshold is performed at a first location associated with the IAB node and providing the vehicle access to at least one of the first node or the at least one second node via the mobile IAB node is performed at a second location associated with the mobile IAB node that is different than the first location.

13. The mobile IAB node of claim 8, further comprising determining an authorization of a user in response to a UE associated with the user communicating with the mobile IAB node.

14. The mobile IAB node of claim 13, further comprising sending a transmission to the vehicle in response to determining the authorization of the user.

15. The mobile IAB node of claim 14, wherein the transmission causes the vehicle to perform an operation comprising at least one of unlocking a door, starting an engine, turning on a headlight, turning on a heating element, or turning on a cooling element.

16. A system including a mobile IAB node comprising: one or more processors; and non-transitory computer-readable media storing computer-executable instructions that, when executed by the one or more processors, cause the one or more processors to perform actions comprising: monitoring a communication link between communication components of a vehicle and a first gNB, the communication components of the vehicle being separate from the mobile IAB node and configured to communicate with a telecommunication core network via the first gNB; determining that a signal strength of the communication link is below a predefined threshold; scanning a geographical area within a predefined distance of the vehicle for at least one second gNB; establishing communication with at least one of the first gNB or the at least one second gNB; providing the vehicle access to at least one of the first gNB or the at least one second gNB via the mobile IAB node; and sending a transmission to a UE associated with the vehicle indicating that the mobile IAB node has been removed from the vehicle in response to determining that the mobile IAB node has exited a geo-fence defining an area around the vehicle.

17. The system of claim 16, wherein the vehicle comprises a first vehicle and the actions further comprise establishing a communication link between the IAB node and a second vehicle such that the first vehicle may communicate with the second vehicle via the IAB node.

18. The system of claim 16, further comprising providing access to at least one user equipment (UE) located inside the vehicle to at least one of the first gNB or the at least one second gNB via the IAB node.

19. The system of claim 16, further comprising establishing an E911 call from the vehicle or a UE located inside the vehicle via the IAB node.

20. The method of claim 1, wherein the transmission is sent via the telecommunication core network.

\* \* \* \* \*